United States Patent
Zhang et al.

(10) Patent No.: US 10,146,120 B1
(45) Date of Patent: Dec. 4, 2018

(54) ROTATION PROJECTOR

(71) Applicant: GEMMY INDUSTRIES CORPORATION, Coppel, TX (US)

(72) Inventors: Cheng-Chun Zhang, Shenzhen (CN); Lio Yenwei Chang, Coppell, TX (US)

(73) Assignee: GEMMY INDUSTRIES CORPORATION, Coppel, TX (US)

( * ) Notice: Subject to any disclaimer, the term of this patent is extended or adjusted under 35 U.S.C. 154(b) by 0 days.

(21) Appl. No.: 16/002,476

(22) Filed: Jun. 7, 2018

(51) Int. Cl.
  *G03B 21/43* (2006.01)
  *G03B 21/14* (2006.01)
  *G03B 21/20* (2006.01)

(52) U.S. Cl.
  CPC ........... *G03B 21/43* (2013.01); *G03B 21/145* (2013.01); *G03B 21/208* (2013.01); *G03B 21/2013* (2013.01)

(58) Field of Classification Search
  CPC .... G03B 21/00; G03B 21/001; G03B 21/005; G03B 21/43; G03B 21/145; G03B 21/321; G03B 21/326; G03B 21/2006; G03B 23/02; G03B 23/105
  See application file for complete search history.

(56) References Cited

U.S. PATENT DOCUMENTS

| | | | |
|---|---|---|---|
| 9,405,181 B2* | 8/2016 | Wong | G03B 37/00 |
| 2015/0022785 A1* | 1/2015 | Kinebuchi | F16M 11/00 |
| | | | 353/52 |

* cited by examiner

*Primary Examiner* — Sultan Chowdhury
(74) *Attorney, Agent, or Firm* — Lynette Wylie; Apex Juris, pllc

(57) ABSTRACT

A rotation projector has a housing and a projection device. The housing has a casing and a mounting support. The mounting support is disposed in the casing. The projection device disposed in the casing and having a driver, a driving shaft, a drive gear, a lighting member, a gear assembly, and a film reel assembly. The driver is mounted on the mounting support. The driving shaft is driven to rotate by the driver. The drive gear is securely mounted on the driving shaft. The lighting member is mounted on the mounting support. The gear assembly is rotatably mounted on the mounting support and engages with the drive gear. The film reel assembly is mounted on the gear assembly and is disposed in front of the lighting member. A pattern projected by the projection device will be rotated.

14 Claims, 10 Drawing Sheets

ROTATION PROJECTOR

BACKGROUND OF THE INVENTION

1. Field of the Invention

The present invention relates to a rotation projector, and more particularly to a rotation projector that can project a rotating pattern by a rotary gear that drives a film in the rotation projector to rotate.

2. Description of Related Art

A conventional projector can project clear patterns. The conventional projector has a housing, a lighting member, a film, and an imaging lens. The housing has a projection opening formed through a front end of the housing. The lighting member is mounted in the housing and has a side surface facing the projection opening. The film is mounted in the housing and is disposed in front of the lighting member. The imaging lens is mounted in the projection opening and is disposed in front of the film. When the conventional projector is in use, light is emitted from the lighting member and passes through the film and the imaging lens, so as to form a clear pattern on a surface.

However, the pattern projected by the conventional projector is static. The conventional projector lacks a mechanism that drives the film to rotate. The static pattern causes visual fatigue on a viewer and is unable to bring about a joyful atmosphere in a party when needed. The convention projector that projects said static patterns cannot be used in a cheerful occasion or party.

To overcome the shortcomings, the present invention tends to provide a rotation projector to obviate the aforementioned problems.

SUMMARY OF THE INVENTION

The main objective of the invention is to provide a rotation projector that solves the problem that the static pattern projected by the conventional projector cannot be used in a cheerful occasion or party.

The rotation projector has a housing and a projection device. The housing has a casing, a mounting support, a power supply member, and a waterproof cover. The mounting support is disposed in the casing. The power supply member is disposed in the casing. The waterproof cover is mounted on the casing.

The projection device is disposed in the casing and has a driver, a driving shaft, a drive gear, a lighting member, a gear assembly, a gear cover, and a film reel assembly. The driver is mounted on the mounting support and electrically connected to the power supply member. The driving shaft protrudes from and is driven to rotate by the driver. The drive gear is mounted on the driving shaft. The lighting member is mounted on the mounting support and electrically connected to the power supply member. The gear assembly is rotatably mounted on the mounting support and engages with the drive gear. The gear cover is mounted on the mounting support and holds the gear assembly. The film reel assembly is mounted on the gear assembly and is disposed in front of the lighting member.

The rotation projector further has a supporting device. The supporting device is mounted on a bottom of the casing and has a rack and a grounding stick. The rack is rotatably mounted on the bottom of the casing. The grounding stick is rotatably mounted on a lower end of the rack.

The driver drives the drive gear and the gear assembly to rotate. The film reel assembly is rotated at the same time. The lighting member is powered to project light to go through the film reel assembly to project rotating patterns. The rotating patterns are dynamic and are suitable for cheerful occasions or parties. Accordingly, the rotation projector is practical.

Other objects, advantages and novel features of the invention will become more apparent from the following detailed description when taken in conjunction with the accompanying drawings.

DETAILED DESCRIPTION OF PREFERRED EMBODIMENT

With reference to FIGS. 1, 2, 5, and 8, a rotation projector in accordance with the present invention comprises a housing 10A, 10B, 10C and a projection device 20A, 20B, 20C.

With reference to FIGS. 1, 2, 5, and 8, the housing 10A, 10B, 10C has a casing 11A, 11B, 11C, a mounting support 12A, 12B, 12C, a power supply member 13A, 13B, 13C, and a waterproof cover 14A, 14B, 14C. The casing 11A, 11B, 11C has a front surface. The mounting support 12A, 12B, 12C is disposed in the casing 11A, 11B, 11C. The power supply member 13A, 13B, 13C is disposed in the casing 11A, 11B, 11C. The waterproof cover 14A, 14B, 14C is mounted on the casing 11A, 11B, 11C.

Figure 2:
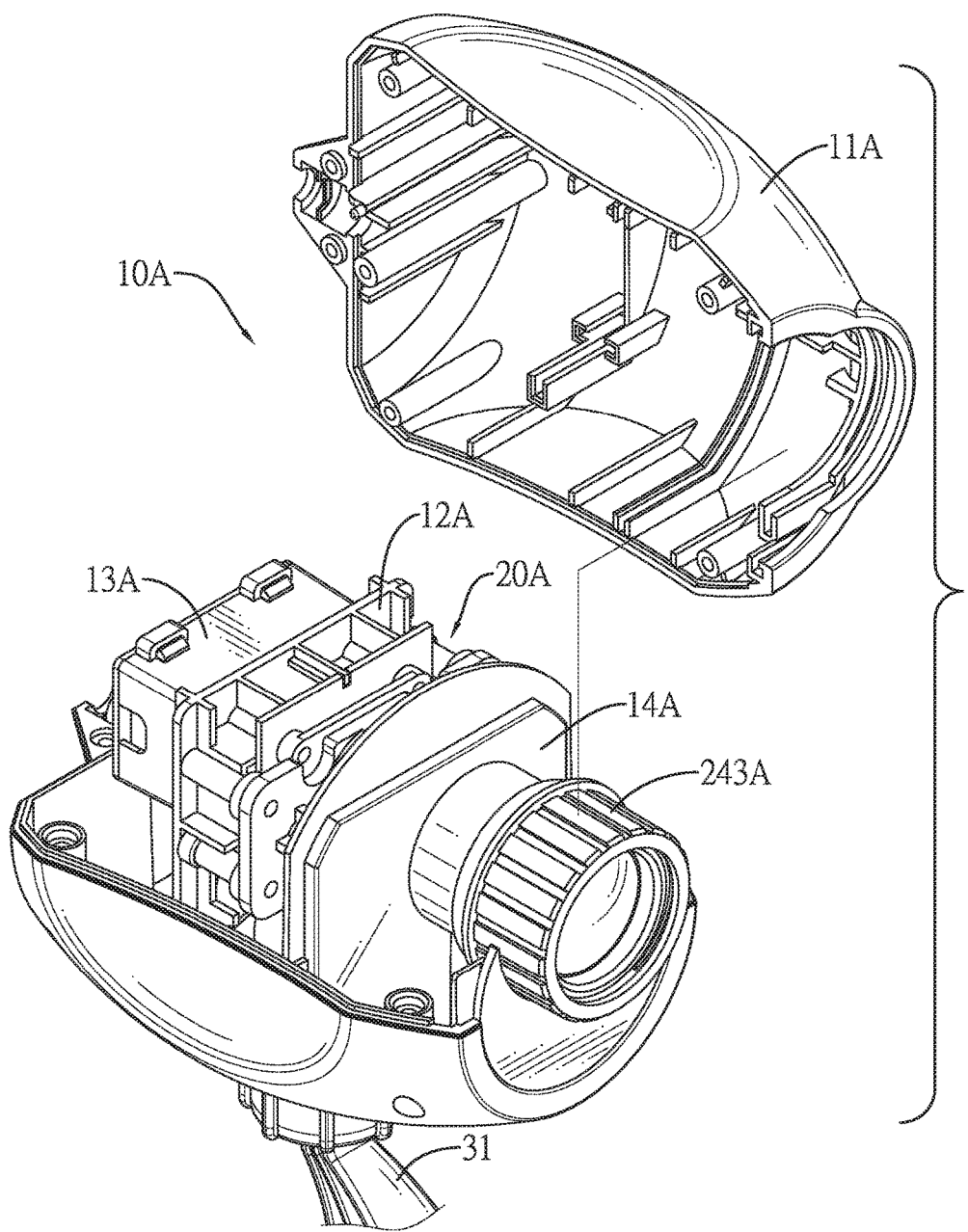
FIG. 2 is an enlarged partially exploded perspective view of the rotation projector in FIG. 1.
Figure 3:
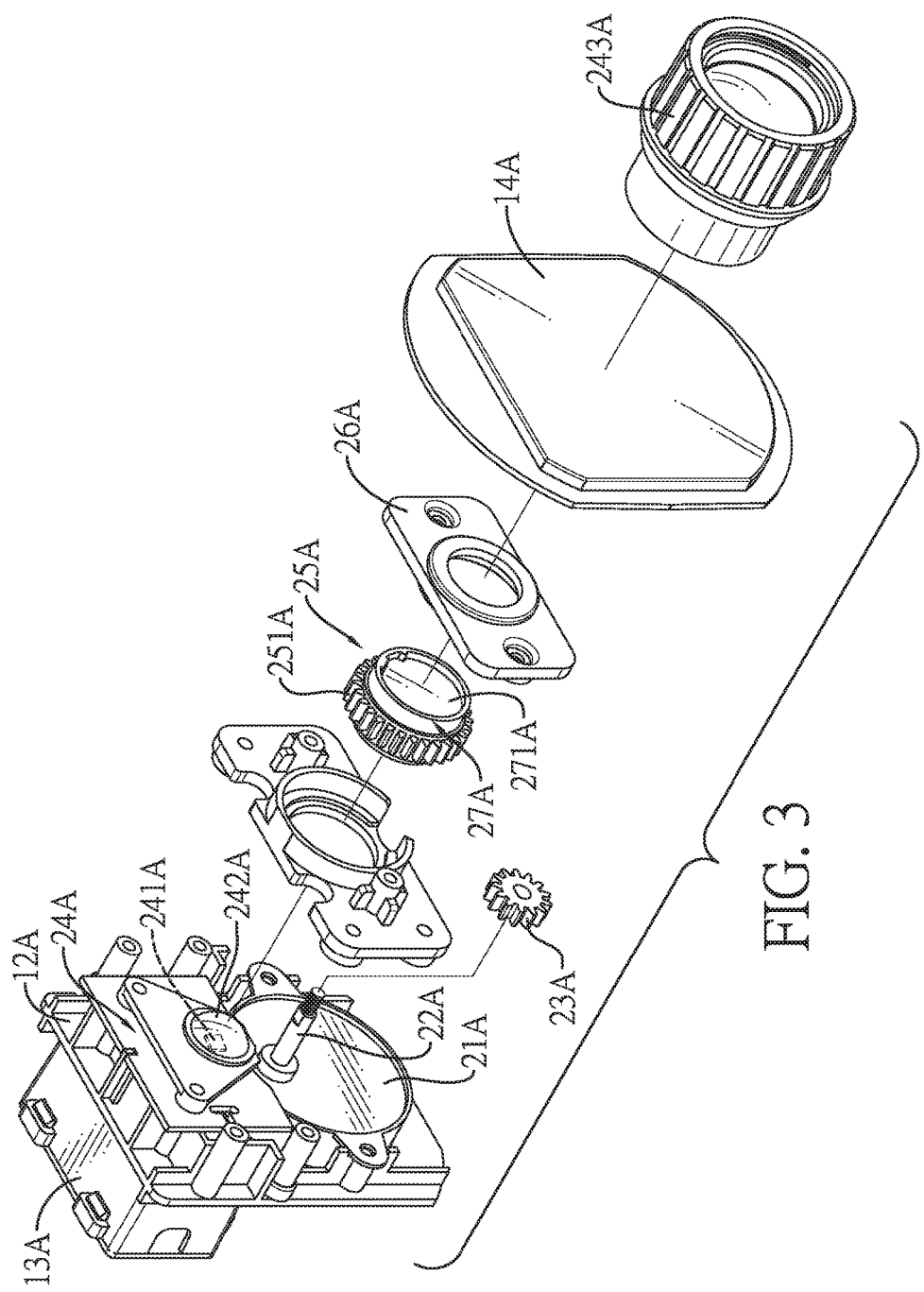
FIG. 3 is an exploded perspective view of a projection device of the rotation projector in FIG. 1.
Figure 5:
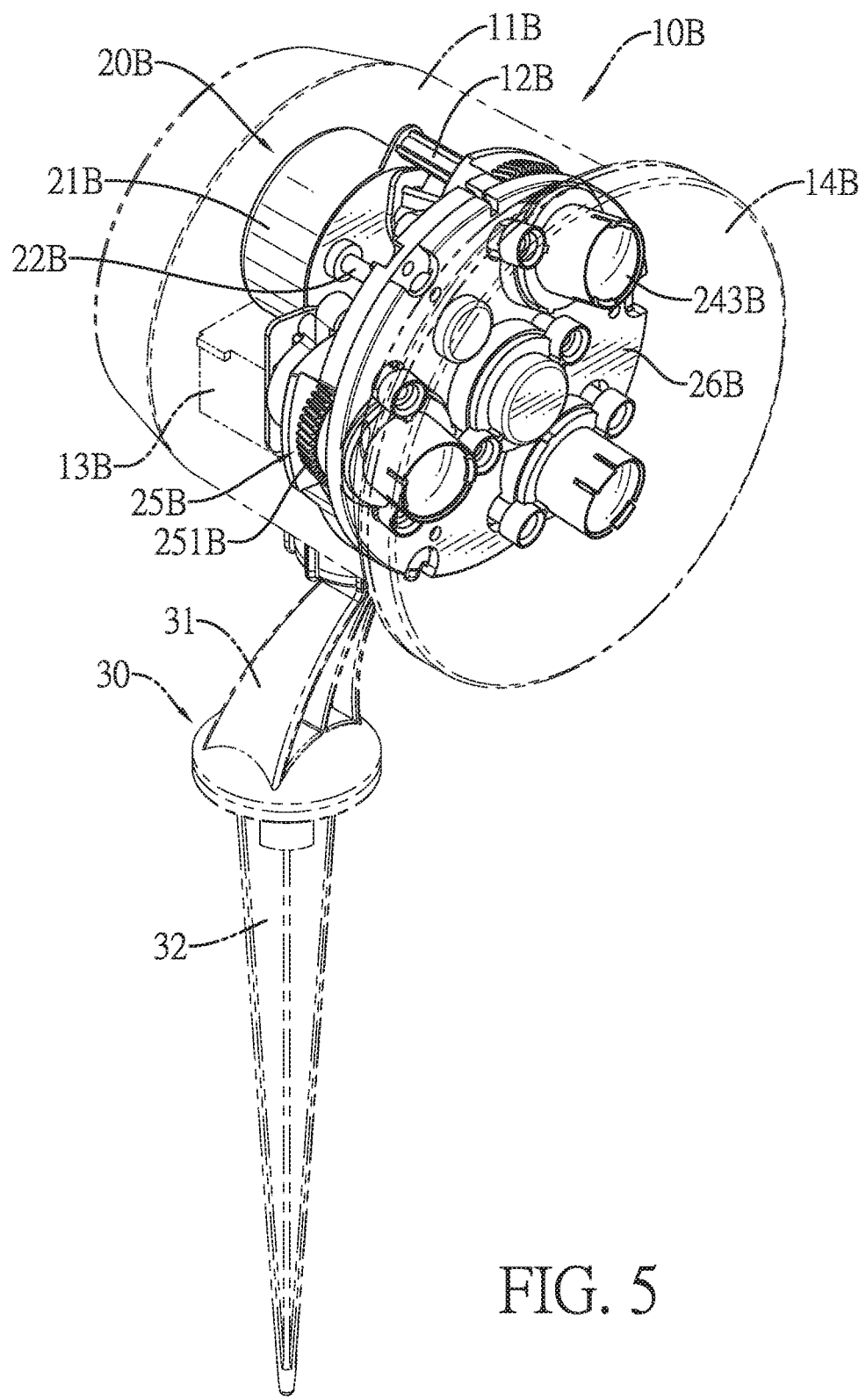
FIG. 5 is a perspective view of a second embodiment of a rotation projector in accordance with the present invention.
Figure 6:
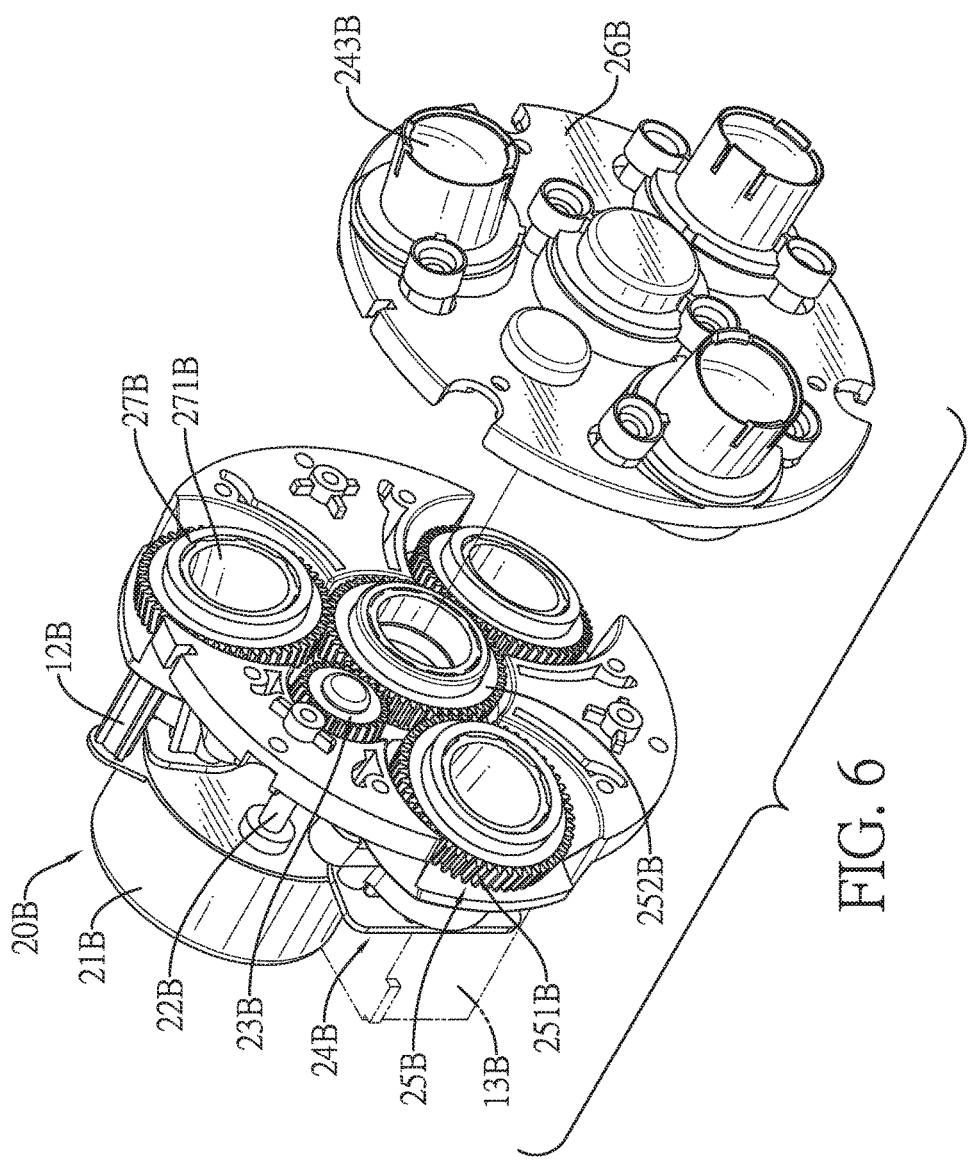
FIG. 6 is a partially exploded perspective view of a projection device of the rotation projector in FIG. 5.
Figure 8:
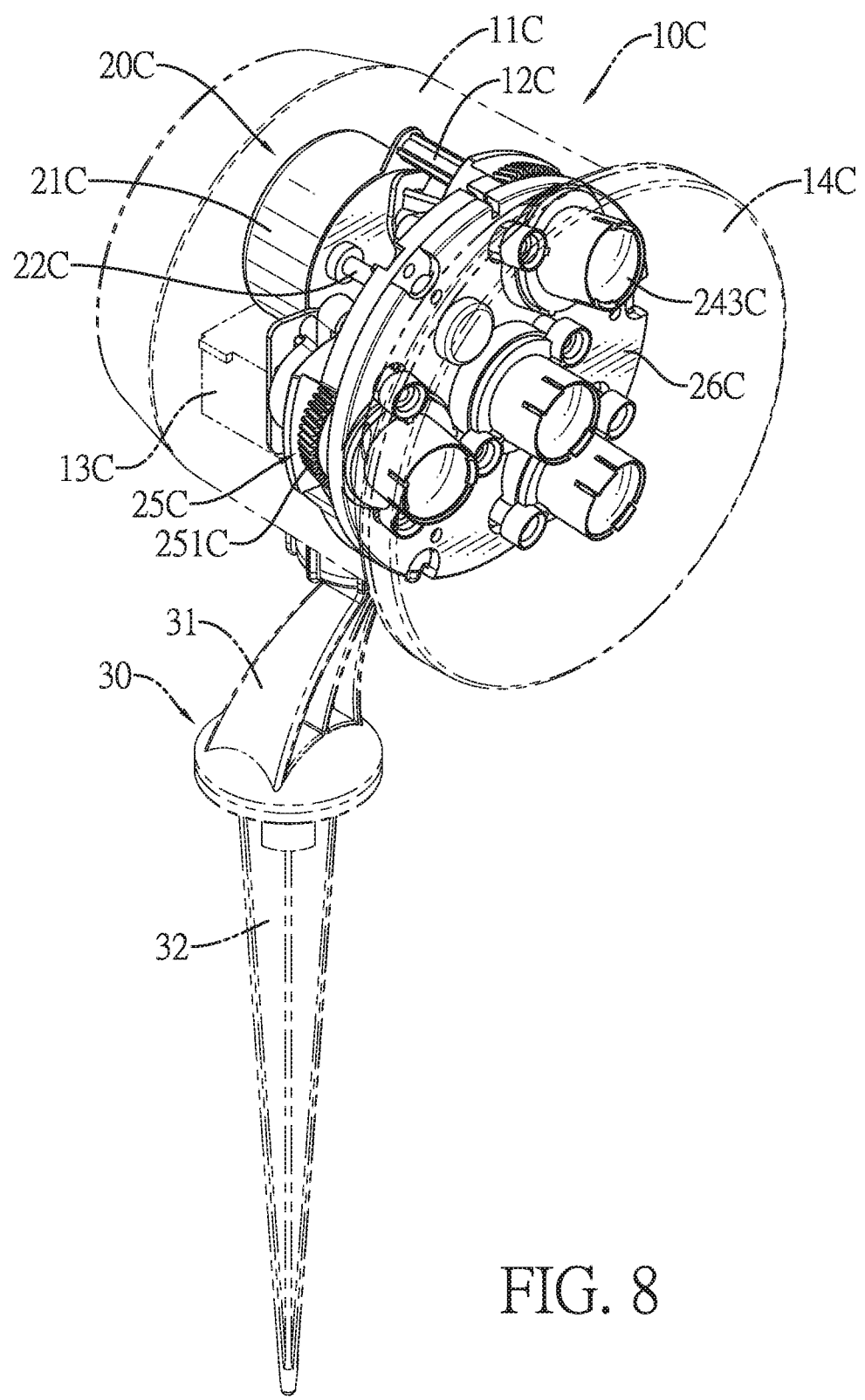
FIG. 8 is a perspective view of a third embodiment of a rotation projector in accordance with the present invention.
Figure 9:
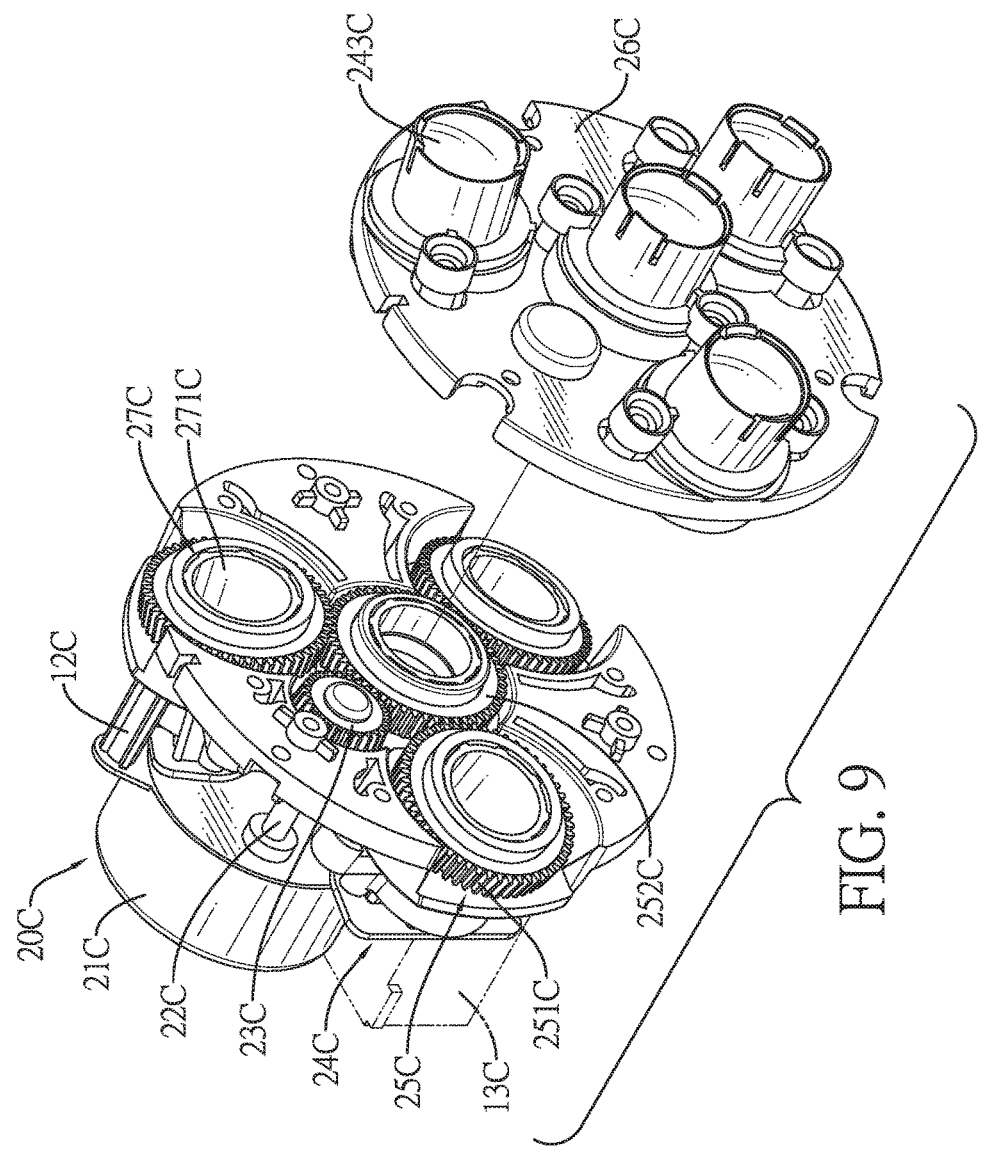
FIG. 9 is a partially exploded perspective view of a projection device of the rotation projector in FIG. 8.

With reference to FIGS. 2, 5, and 8, the projection device 20A, 20B, 20C is mounted in the casing 11A, 11B, 11C. With further reference to FIGS. 3, 6, and 9, the projection device 20A, 20B, 20C has a driver 21A, 21B, 21C, a driving shaft 22A, 22B, 22C, a drive gear 23A, 23B, 23C, a lighting member 24A, 24B, 24C, a gear assembly 25A, 25B, 25C, a gear cover 26A, 26B, 26C, and a film reel assembly 27A, 27B, 27C. The driver 21A, 21B, 21C is mounted on the mounting support 12A, 12B, 12C and is electrically connected to the power supply member 13A, 13B, 13C. The driving shaft 22A, 22B, 22C protrudes from and is driven to rotate by the driver 21A, 21B, 21C. The drive gear 23A, 23B, 23C is securely mounted on the driving shaft 22A, 22B, 22C. The lighting member 24A, 24B, 24C is mounted on the mounting support 12A, 12B, 12C and is electrically connected to the power supply member 13A, 13B, 13C. The gear assembly 25A, 25B, 25C is rotatably mounted on the mounting support 12A, 12B, 12C and engages with the drive gear 23A, 23B, 23C. The gear cover 26A, 26B, 26C is mounted on the mounting support 12A, 12B, 12C and holds the gear assembly 25A, 25B, 25C. The film reel assembly 27A, 27B, 27C is mounted on the gear assembly 25A, 25B, 25C and is disposed in front of the lighting member 24A, 24B, 24C.

Figure 1:
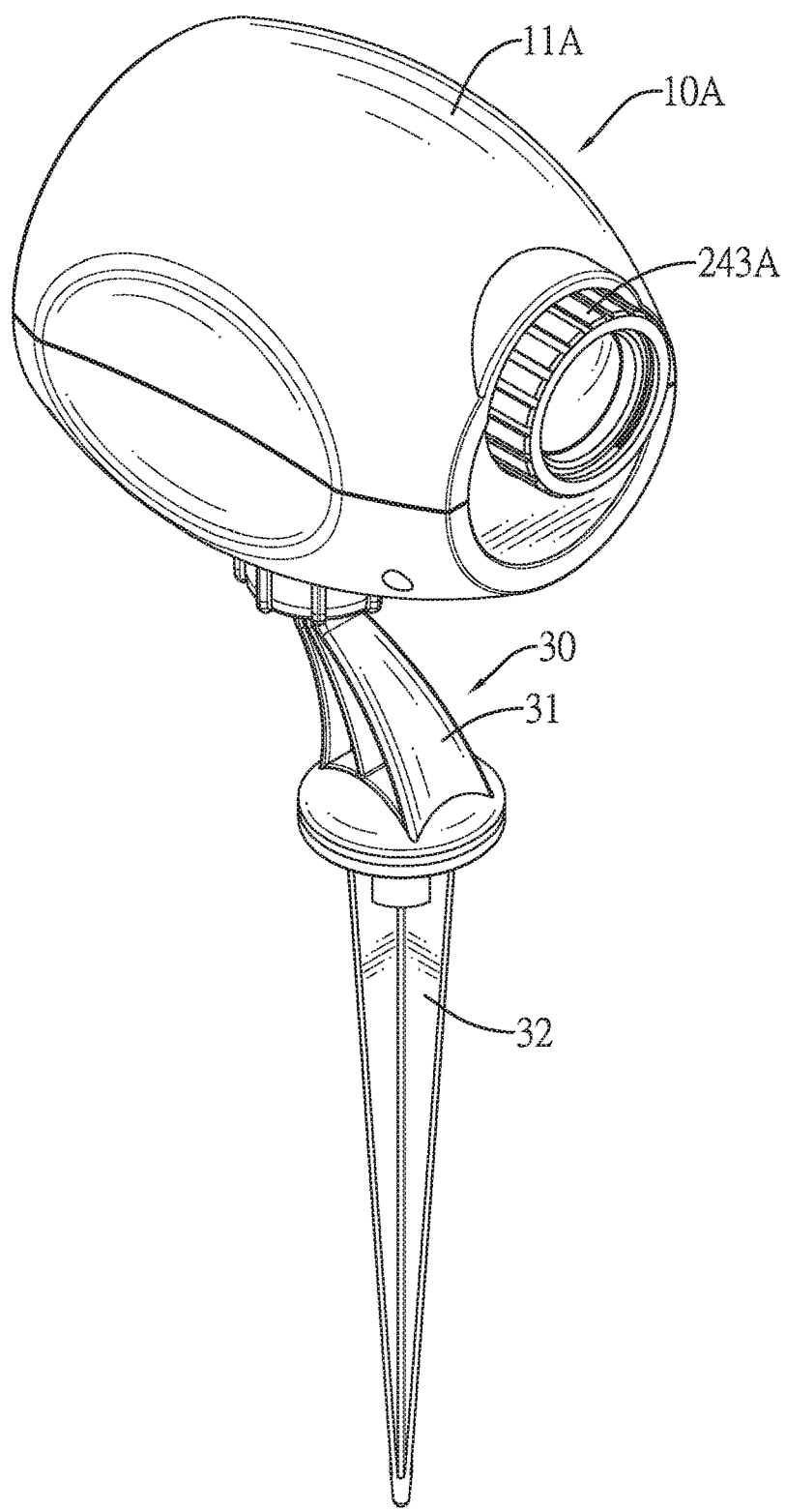
FIG. 1 is a perspective view of a first embodiment of a rotation projector in accordance with the present invention.
Figure 4:
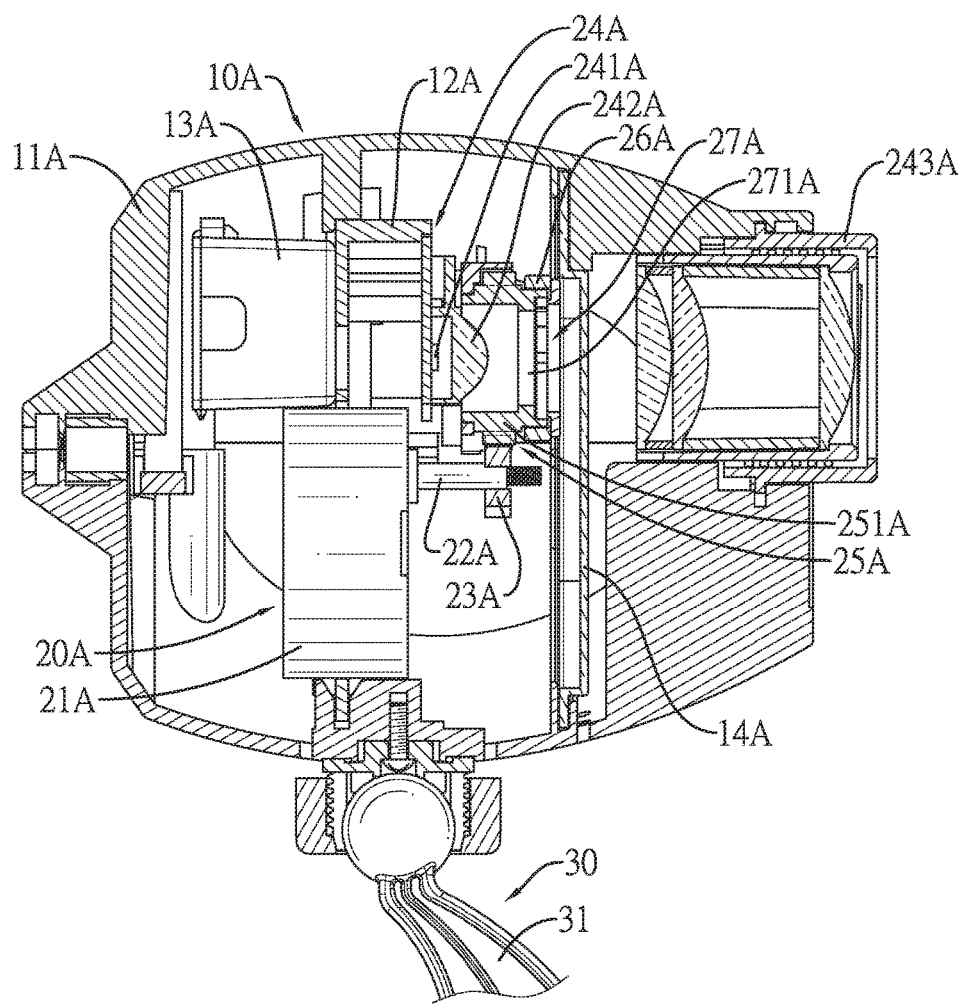
FIG. 4 is an enlarged side view in partial section of the rotation projector in FIG. 1.

With reference to FIGS. 1, 3, and 4, in a first preferred embodiment of the rotation projector, the lighting member 24A has a lighting element 241A, a spotlight lens 242A and an imaging lens 243A. The lighting element 241A is mounted on the mounting support 12A. The spotlight lens 242A is mounted on the mounting support 12A and is disposed in front of the lighting element 241A. The imaging lens 243A is mounted on the front surface of the casing 11A and is disposed in front of the lighting element 241A, the gear assembly 25A, and the waterproof cover 14A. The gear assembly 25A has a rotary gear 251A mounted on the mounting support 12A and engaging with the drive gear 23A. The film reel assembly 27A has a film 271A mounted on the rotary gear 251A and disposed in front of the lighting element 241A.

Figure 7:
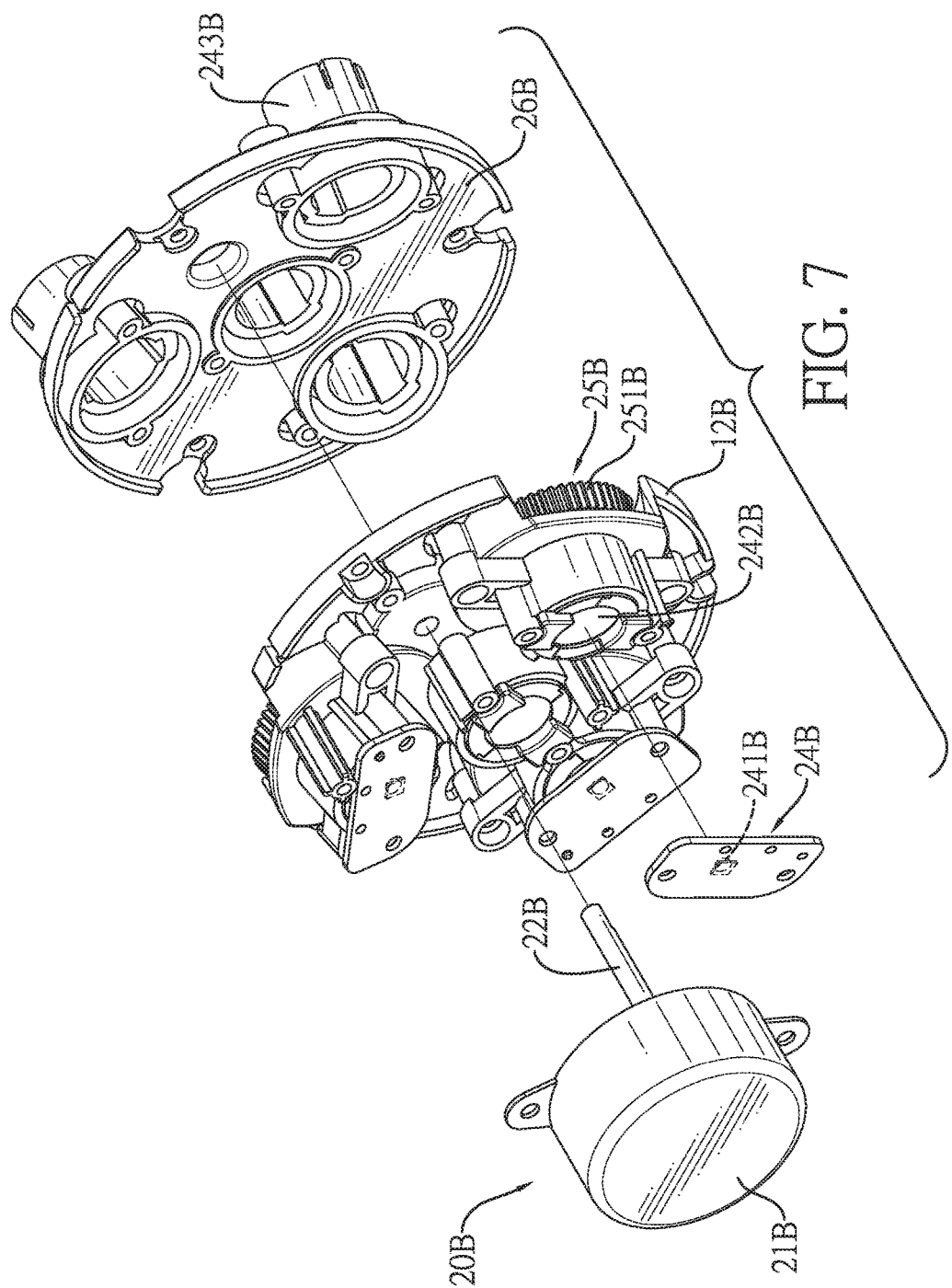
FIG. 7 is another partially exploded perspective view of the projection device of the rotation projector in FIG. 5.

With reference to FIGS. 5 to 7, in a second preferred embodiment of the rotation projector, the lighting member 24B has three lighting elements 241B, three spotlight lenses 242B and three imaging lenses 243B. The lighting elements 241B are separately mounted on the mounting support 12B. The spotlight lenses 242B are separately mounted on the mounting support 12B and are respectively disposed in front of the lighting elements 241B. The imaging lenses 243B are separately mounted on the gear cover 26B and are respectively disposed in front of the lighting elements 241B. Each imaging lens 243B has a front surface facing the waterproof cover 14B. The gear assembly 25B has a link gear 252B and three rotary gears 251B. The link gear 252B is mounted on the mounting support 12B and engages with the drive gear 23B. The rotary gears 251B are separately mounted on the mounting support 12B, are arranged around the link gear 252B, and engage with the link gear 252B. The film reel assembly 27B has three films 271B respectively mounted on the rotary gears 251B and respectively disposed in front of the lighting elements 241B. Each film 271B has a front surface facing the waterproof cover 14B.

Figure 10:
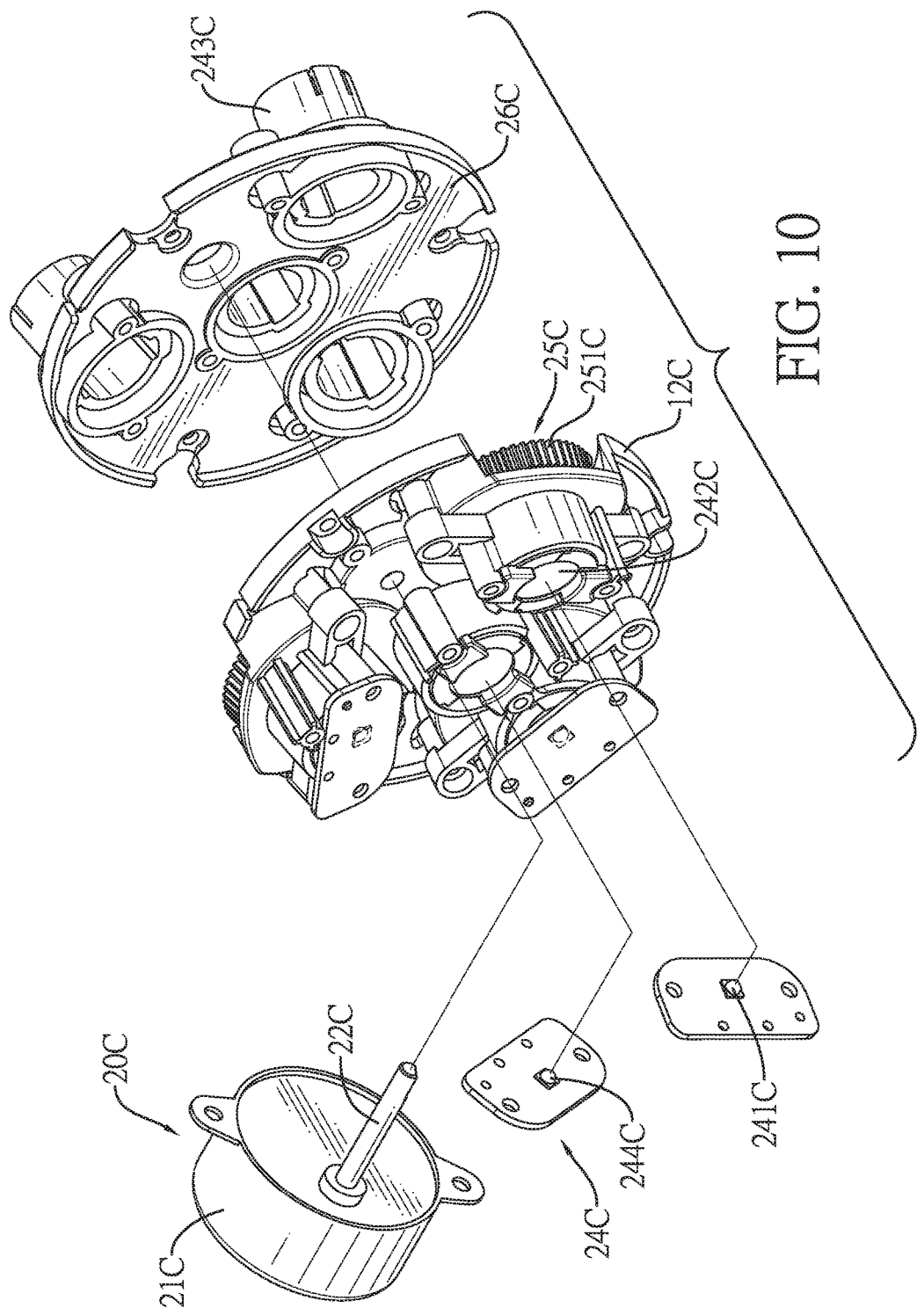
FIG. 10 is another partially exploded perspective view of the projection device of the rotation projector in FIG. 8.

With reference to FIGS. 8 to 10, in the third preferred embodiment of the rotation projector, the lighting member 24C has a background light assembly 244C, three lighting elements 241C, four spotlight lenses 242C, and four imaging lenses 243C. The background light assembly 244C is mounted on the mounting support 12C and has an image. The lighting elements 241C are mounted on the mounting support 12C and are arranged around the background light assembly 244C. The spotlight lenses 242C are mounted on the mounting support 12C and are respectively disposed in front of the lighting elements 241C and the background light assembly 244C. The imaging lenses 243C are mounted on the gear cover 26C and are respectively disposed in front of the lighting elements 241C and the background light assembly 244C. Each imaging lens 243C has a front surface facing the waterproof cover 14C. The gear assembly 25C has a transmission gear 252C and three rotary gears 251C. The transmission gear 252C is mounted on the mounting support 12C and engages with the drive gear 23C. The rotary gears 251C are separately mounted on the mounting support 12C, are arranged around the transmission gear 252C, and engage with the transmission gear 252C. The film reel assembly 27C has three films 271C respectively mounted on the rotary gears 251C and respectively disposed in front of the lighting elements 241C. Each film 271C has a front surface facing the waterproof cover 14C.

With reference to FIGS. 1, 5, and 8, the supporting device 30 is mounted on a bottom of the casing 11A, 11B, 11C and has a rack 31 and a grounding stick 32. The rack 31 is rotatably mounted on the bottom of the casing 11A, 11B, 11C. The grounding stick 32 is rotatably mounted on a lower end of the rack 31.

When the first preferred embodiment of the rotation projector is in use, with reference to FIGS. 2 to 4, an electric wire transmits electricity to the power supply member 13A located in the casing 11A. The power supply member 13A can transfer alternating current (AC) to direct current (DC) and supplies DC to the driver 21A and the lighting member 24A of the projection device 20A. As the driver 21A is powered, the driver 21A drives the driving shaft 22A as well as the drive gear 23A to rotate. The rotary gear 251A of the gear assembly 25A is driven to rotate by the drive gear 23A at the same time. The film 271A mounted on the rotary gear 251A is rotated as well. When the lighting member 24A is powered, light is emitted from the lighting element 241A. The light passes through the film 271A mounted on the rotary gear 251A. Since the rotary gear 251A and the film 271A are rotated at the same time, an image on the film 271A is projected to form a rotating pattern. The rotating pattern is dynamic and interesting and is suitable for cheerful occasions or parties.

When the second preferred embodiment of the rotation projector is in use, with reference to FIGS. 5 to 7, the driver 21B is powered and drives the driving shaft 22B as well as the drive gear 23B. The link gear 252B and the rotary gear 251B of the gear assembly 25B are driven to rotate by the drive gear 23B at the same time. The films 271B mounted on the rotary gears 251B are rotated as well. When the lighting elements 241B of the lighting member 24B are powered, light is emitted from the lighting elements 241B and passes through the films 271B that are rotating. Thus, images on the three films 271B are projected to form three rotating patterns.

When the third preferred embodiment of the rotation projector is in use, with reference to FIGS. 8 to 10, the driver 21C is powered and drives the driving shaft 22C and the drive gear 23C to rotate. The transmission gear 252C and the rotary gears 251C of the gear assembly 25C are driven to rotate by the drive gear 23C simultaneously. The films 271C mounted on the rotary gears 251C are rotated as well. When the lighting member 24C is powered, light is emitted from the lighting elements 241C and the background light assembly 244C. The light passes through the films 271C mounted on the rotary gears 251C and passes through the transmission gear 252C. Thus, images on the three films 271C and the image of the background light assembly 244C are projected to form three rotating patterns and one background pattern. The rotation projector allows viewers to see three dynamic rotating patterns and one static pattern.

With reference to FIGS. 1, 5, and 8, a bottom end of the grounding stick 32 is pointed and can be inserted into the ground directly. With reference to FIGS. 2, 5, and 8, with the waterproof cover 14A, 14B, 14C on the casing 11A, 11B, 11C, the rotation projector can be used outdoors. Moreover, with reference to FIGS. 3, 6, and 9, the colors of the lights emitted from the lighting member 24A, 24B, 24C can be changed to vary colors of the pattern projected.

Accordingly, the rotation projector projects the rotating patterns by the driver 21A, 21B, 21C driving the drive gear 23A, 23B, 23C and the gear assembly 25A, 25B, 25C to rotate. The film reel assembly 27A, 27B, 27C is rotated at the same time. The lighting member 24A, 24B, 24C is powered to project the light to go through the film reel assembly 27A, 27B, 27C to project the rotating patterns. The rotating patterns are dynamic and are suitable for cheerful occasions or parties. Accordingly, the rotation projector is practical.

What is claimed is:

1. A rotation projector comprising:
    a housing having
        a casing;
        a mounting support disposed in the casing;
        a power supply member disposed in the casing; and
        a waterproof cover mounted on the casing; and
    a projection device disposed in the casing and having
        a driver mounted on the mounting support and electrically connected to the power supply member;
        a driving shaft protruding from and driven to rotate by the driver;
        a drive gear mounted on the driving shaft;
        a lighting member mounted on the mounting support and electrically connected to the power supply member;
        a gear assembly rotatably mounted on the mounting support and engaging with the drive gear;
        a gear cover mounted on the mounting support and holding the gear assembly; and
        a film reel assembly mounted on the gear assembly and disposed in front of the lighting member.

2. The rotation projector as claimed in claim 1, wherein
    the lighting member has
        a lighting element mounted on the mounting support; and
    the gear assembly has
        a rotary gear mounted on the mounting support and engaging with the drive gear; and
    the film reel assembly has
        a film mounted on the rotary gear and disposed in front of the lighting element.

3. The rotation projector as claimed in claim 2, wherein
    the lighting member has
        a spotlight lens mounted on the mounting support and disposed in front of the lighting element; and
        an imaging lens mounted on a front surface of the casing and disposed in front of the lighting element, the gear assembly, and the waterproof cover.

4. The rotation projector as claimed in claim 1, wherein
    the lighting member has
        three lighting elements separately mounted on the mounting support; and
    the gear assembly has
        a link gear mounted on the mounting support and engaging with the drive gear; and
        three rotary gears separately mounted on the mounting support arranged around the link gear and engaging with the link gear; and
    the film reel assembly has
        three films respectively mounted on the rotary gears and respectively disposed in front of the lighting elements, and each film having a front surface facing the waterproof cover.

5. The rotation projector as claimed in claim 4, wherein
    the lighting member has
        three spotlight lenses separately mounted on the mounting support and respectively disposed in front of the lighting elements; and
        three imaging lenses separately mounted on the gear cover and respectively disposed in front of the lighting elements, and each imaging lens having a front surface facing the waterproof cover.

6. The rotation projector as claimed in claim 1, wherein
    the lighting member has
        a background light assembly mounted on the mounting support and having an image; and
        three lighting elements mounted on the mounting support and arranged around the background light assembly; and
    the gear assembly has
        a transmission gear mounted on the mounting support and engaging with the drive gear; and
        three rotary gears separately mounted on the mounting support arranged around the transmission gear, and engaging with the transmission gear; and
    the film reel assembly has
        three films respectively mounted on the rotary gears and respectively disposed in front of the lighting elements, and each film having a front surface facing the waterproof cover.

7. The rotation projector as claimed in claim 6, wherein
    the lighting member has
        four spotlight lenses mounted on the mounting support and respectively disposed in front of the lighting elements and the background light assembly; and
        four imaging lenses mounted on the gear cover and respectively disposed in front of the lighting elements and the background light assembly, and each imaging lens having a front surface facing the waterproof cover.

8. The rotation projector as claimed in claim 1, wherein the rotation projector has a supporting device, the supporting device is mounted on a bottom of the casing and has a rack and a grounding stick, the rack is rotatably mounted on the bottom of the casing, and the grounding stick is rotatably mounted on a lower end of the rack.

9. The rotation projector as claimed in claim 2, wherein the rotation projector has a supporting device, the supporting device is mounted on a bottom of the casing and has a rack and a grounding stick, the rack is rotatably mounted on the bottom of the casing, and the grounding stick is rotatably mounted on a lower end of the rack.

10. The rotation projector as claimed in claim 3, wherein the rotation projector has a supporting device, the supporting device is mounted on a bottom of the casing and has a rack and a grounding stick, the rack is rotatably mounted on the bottom of the casing, and the grounding stick is rotatably mounted on a lower end of the rack.

11. The rotation projector as claimed in claim 4, wherein the rotation projector has a supporting device, the supporting device is mounted on a bottom of the casing and has a rack and a grounding stick, the rack is rotatably mounted on the bottom of the casing, and the grounding stick is rotatably mounted on a lower end of the rack.

12. The rotation projector as claimed in claim 5, wherein the rotation projector has a supporting device, the supporting device is mounted on a bottom of the casing and has a rack and a grounding stick, the rack is rotatably mounted on the bottom of the casing, and the grounding stick is rotatably mounted on a lower end of the rack.

13. The rotation projector as claimed in claim 6, wherein the rotation projector has a supporting device, the supporting device is mounted on a bottom of the casing and has a rack and a grounding stick, the rack is rotatably mounted on a bottom of below the casing, and the grounding stick is rotatably on a lower end of the rack.

14. The rotation projector as claimed in claim 7, wherein the rotation projector has a supporting device, the supporting device is mounted on a bottom of the casing and has a rack and a grounding stick, the rack is rotatably mounted on the bottom of the casing, and the grounding stick is rotatably mounted on a lower end of the rack.

* * * * *